Patented Sept. 4, 1923.

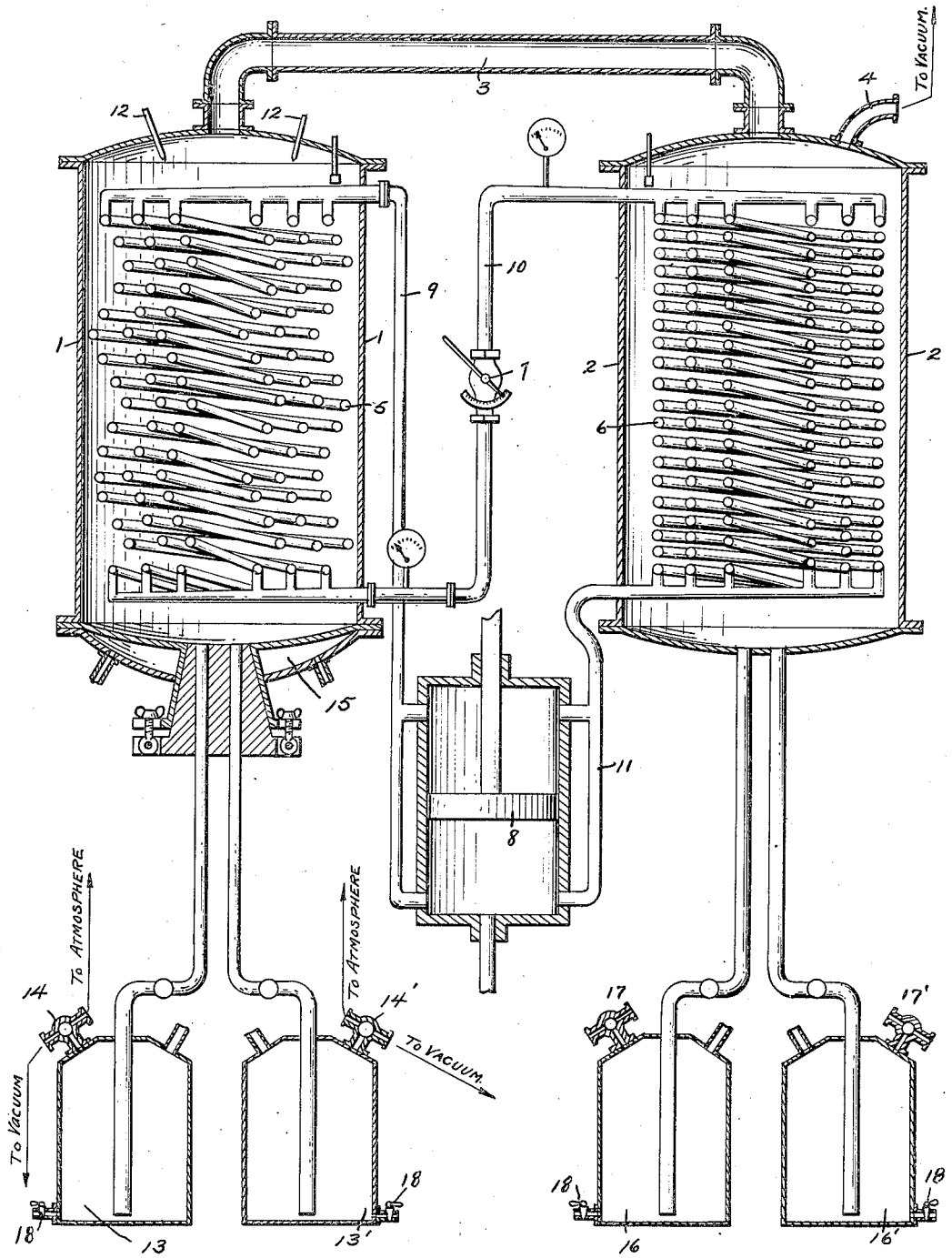

1,466,670

UNITED STATES PATENT OFFICE.

EUDO MONTI, OF TURIN, ITALY.

PROCESS FOR CONCENTRATING SOLUTIONS AND EVAPORATING FLUIDS.

Application filed November 19, 1919. Serial No. 339,205.

*To all whom it may concern:*

Be it known that I, EUDO MONTI, a subject of the King of Italy, residing at Turin, in the Kingdom of Italy, have invented certain new and useful Improvements in Processes for Concentrating Solutions and Evaporating Fluids; and I do hereby declare the following to be a full, clear, and exact description of the invention, such as will enable others skilled in the art to which it appertains to make and use the same.

The present invention has for its object a process for concentrating solutions and evaporating fluids in general and especially flavoured extracts, alcohol, ethers, essences, perfumes and the like, at a low temperature, availing myself of the heat developed by the liquefaction of the compressed gas in the condenser of a refrigerating machine, in order to evaporate the fluid under a low absolute pressure, and also taking advantage of the absorption of heat caused by the evaporation of the condensed gas in the refrigerant of said machine, as set forth in the following specification.

The present invention is an improvement of the processes described and claimed in my U. S. Patents No. 973280 dated Oct. 18, 1910, No. 1065829 dated June 4th 1913, also in my U. S. patent applications No. 123563 filed October 3rd, 1916, and 285906 filed March 28th, 1919, but characterized by the fact that the pipes of the condenser of a freezing machine substitute for the bundle of lukewarm water tubes in which my prior inventions aforesaid; also the condensing pipes of the condenser shown in my prior patents and applications replaced in the present application are by the pipes of the evaporator or refrigerant of said freezing machine. Moreover the fluid to be evaporated or the solution to be concentrated is atomized by means of a sprayer and caused to fall on the surface of the comparatively hot pipes of the condenser, where most of the fluid is evaporated while the concentrated solution or the less volatile fluid (for instance the water contained in an alcoholic solution) are collected alternatively in two or more collectors in which the absolute pressure has been previously reduced by means of a pump to the same pressure existing in the evaporating pans. From said collectors the solution or fluid may of course if necessary be spread again on the pipes of the condensers till the desired effect is obtained. When the freezing point of the fluid to be evaporated (alcohol ethers or essences) is low, the temperature of the condenser may be allowed to lower to a point approaching the freezing point of the condensing fluid, but should the fluid be water, the pressure in the refrigerant of the ice machine must be controlled in order to avoid the formation of ice which would coat the pipes and hinder the absorption of heat. In such circumstances the condenser described in my U. S. patent application 285907 or any other type of condenser may be used provided it is cooled with very cold water, for instance, the water thawed on the ice separated from the same solution during the first stage of the process described in my U. S. Patent 973290 dated October 18th, 1910.

This arrangement is particularly adapted to separate from grape juice, nonalcoholic beer or the like, the small percentage of alcohol they might eventually contain, without altering the flavour or the dietetic properties of the product, also to differentiate spirits, essences, or perfumes, which would alter if heated at a temperature near their boiling point under atmospheric pressure, also for the distillation and concentration of solutions in general when fuel is scarce and costly or when little or no cooling water is available.

The annexed drawing shows diagrammatically and by way of example a constructional form of the apparatus for carrying on the process forming the object of this invention. This apparatus is not claimed herein but is claimed in a co-pending application, Serial No. 339,204. 1 indicates the evaporator and 2 the condenser which are connected above by means of the pipe 3. The condenser 2 communicates by means of the tube 4 with a vacuum pump (not shown) of any known suitable type.

Inside the evaporator 1 is placed a coil 5 wherein is caused to circulate the gas arriving directly from the compressor of a freezing machine; inside the condenser 2 is placed a coil 6 wherein is caused to expand the gas flowing through a suitable reduction valve 7 from the coil 5 drawn by the compressor of the freezing machine directly from the coil 6.

Therefore, the apparatus 1 with its coil 5 constitutes respectively: the evaporator for the solution to be concentrated and the condenser for the freezing machine.

The apparatus 2 with its coil 6 constitutes: the condenser for the solution to be concentrated and the evaporator for the freezing machine.

8 shows diagrammatically the compressor of the freezing machine; 9, 10 and 11 show respectively the tubes establishing the communication between the compressor 8 and the coil 5, the coils 5 and 6, the coil 6 and the compressor 8. The solution to be evaporated is finely sprayed by the atomizers 12 in the apparatus 1 on the coil 5, the alternated turns of which are so disposed as to fill up the apparatus 1 and to prevent the solution from dropping too rapidly on the bottom of the apparatus 1, which solution is on the contrary caused to fall gradually, moistening the whole surface of the coil tubes.

The more concentrated solution passes alternatively from the bottom of the apparatus 1 into one of the two containers 13 and 13' which are connected with the vacuum pump through a three-way cock 14, 14', connecting the container with the above mentioned pump or with the atmosphere, while the other container (where the solution has previously been collected) is connected through a suitable pipe with the sprayers 12, after atmospheric pressure has been re-established therein by means of the cock 17, if a further concentration of the solution is required, or with the collecting apparatus (not shown).

The apparatus 1 can be provided with a double bottom 15 wherein lukewarm water may be caused to circulate whenever a further heating of the solution in the evaporator is required.

The condenser 2 may be provided at its bottom with a barometric tube for the outlet of the condensed products, or with collecting apparatus 16, 16' similar to the containers 13, 13'.

Said containers are provided near the bottom with cocks 18 for the outlet of the already treated juices.

In order to make better understood the description of the proceeding I claim, I will describe its application to two typical cases, that is the dealcoholization of slightly fermented grape juice, malt extract, or the like, and the differentiation of alcoholic solutions of essences, having a different boiling point.

Very often grapes during their transportation from the vineyards to the factory, or while they are being stemmed and crushed, will ferment and though the fermentation be stopped by cooling, filtering or sterilizing said juice, the product often contains a more or less considerable percentage of alcohol which would make the product derived therefrom objectionable as a nonalcoholic drink. Also practice has proved that nonalcoholic beer would not have its characteristic taste if the malt extract has not initiated its fermentation, and its taste would alter if the separation of the alcohol thus formed were carried on at a high temperature or if the beer were to come into contact with steam heated surfaces. Grape juice is much more alterable than beer and will lose some of its original taste and flavour even if concentrated in a steam heated vacuum pan. The percentage of alcohol to be removed is generally small and ranges from 1 to 3% but in order to remove it under the atmospheric pressure the sugary juice should be warmed at from 213° to 215° F. (101° to 102° C.) and at this temperature the albumin will curdle and separate and the enzyms and vitamines and all the ingredients which assist digestion will be so altered that the juice would lose its taste and dietetic properties, the albumin sticking to the steam heated pipes will curdle, coating said pipes and double bottoms, thus hindering the transmission of heat and communicating to the juice a very objectionable taste. I avoid such inconvenience by spreading the somewhat alcoholic juice previously atomized by means of a spreader on the heated coil 5 of the apparatus above described while the pump and the condenser maintain in said evaporator a pressure not exceeding 30 m/m Hg. Some of the water and all the alcohol will evaporate, condensing afterwards on the pipes of refrigerator 2 and dropping alternatively into reservoirs 16 and 16', while the dealcoholized juice, syrup or beer, is alternatively collected in reservoirs 13 and 13', from which it can easily be extracted without allowing any air to enter the evaporator by closing the cock 17 and opening cocks 18. Should the juice not be concentrated enough to keep, or should it still contain a little alcohol, I open the cock communicating with the evaporator 1 and with the cocks 17 so that the concentrated juice drops into reservoir 13' while the somewhat concentrated juice contained in reservoir 13 will again feed the sprayers and, after having been furtherly concentrated and dealcoholized, will drop into reservoir 13'. The operation may be continued using reservoirs 13 and 13' alternatively, as feeders and collectors till the required concentration and complete dealcoholization is obtained. Should the concentration required exceed 75% in weight of dry extract a concentrator of the type described in my Patent No. 1,398,339 of November 29th, 1921, should be used to complete the dehydration of the syrup or extract.

The apparatus will also answer the purpose of separating essences, or any other liquid having different boiling points or whose vapours have a different tension under a given temperature, and especially for the extraction and separation of essences or perfumes from their alcoholic solutions or the separation of ether from alcoholic solutions containing fat. In such cases the condensation of ammonia or other gas in the coils of the condenser 1 is used to heat the evaporator and in the refrigerant 2, acting as a condenser of the distilling apparatus, the speed of the vacuum pump and the quantity of essence running through the atomizer should be regulated in such a way as to obtain an increasing temperature inside of the coil of the condenser and a lower temperature in the condensing pan. Moreover the absolute pressure in the distilling apparatus should be diminished accordingly. To make the proceeding better understood I will describe the case in which the apparatus is used for the treatment of a solution of scented grease in a mixture of two parts of alcohol and 1 of sulphuric ether which, under atmospheric pressure boil respectively at 34 and 78° C. while the mixture starts to boil at about 32° C. I first warm in a water bath the mixture contained in a covered pan to a temperature of about 25° C., if the outside temperature is lower, start the air pump and work it till the absolute pressure in the apparatus is lowered to about 200 m/m Hg., under which pressure the ether will evaporate at a temperature of 20° C. and condense at about 0 while the temperature of the ammonia in the evaporator rises from 16 to 26°. I separate thus almost all the ether with a little alcohol, also some of the essence which will be collected in one of the collectors 16, 16' while the alcohol containing almost all the essence, the grease (whose melting point is of about 26° C.) and some water will collect in reservoirs 13 and 13' from which they will be passed again through the atomizer. The ether collecting in reservoirs 16 and 16' contains a small percentage of alcohol and essence and will be used again to dissolve the scented grease in a further operation. I work then the vacuum pump and the regulator of the expansion of the gas in such a way that the pressure in the evaporator will descend to from 30 to 50 m/m Hg., while the temperature of ammonia in the condenser raises to about 36 and the alcohol with a little ether and almost all the essence will evaporate and collect in reservoirs 16 and 16' while the melted fat and a little water with some alcohol will collect in collectors 13 and 13' which may, if necessary, be warmed by circulation of lukewarm water in order to completely melt the grease which contains still some alcohol and essence and will therefore be used to fix the scent extracted from other quantities of flowers.

Evidently petroleum ether which is cheaper than sulphuric ether may be used instead of the latter in order to dissolve the grease and be separated in the same way.

The essences prepared according to the process above described are of a much better quality than the essences distilled as usual in a steam heated or even in a hot water heated vacuum pan refrigerated with spring water at about 15° C. under an absolute pressure of from 60 to 100 m/m Hg.

The above described apparatus may be used for the rectification of spirits, especially brandy.

Essences, liquors, and the like, obtained without use of steam do not contain furfurol, and it is a well known fact that brandy and liquors distilled in vacuum are of much better quality than the same products distilled under atmospheric pressure or even in a steam heated vacuum pan.

I claim:

1. The process of separating fluids of different volatilities which comprises, compressing a gaseous medium to generate heat therein, bringing the heated medium into heat exchanging contact with the fluids to be separated to volatilize the more volatile fluid, and causing the said medium to expand in heat exchanging contact with said volatilized fluid to condense the same.

2. The process of separating fluids of different volatilities which consists in compressing a gaseous medium to generate heat therein, atomizing the fluids to be separated and bringing them into heat exchanging relation with the heated medium in a vacuum chamber so that the more volatile fluid is volatilized; causing the said medium again to expand and bringing the volatilized fluid into heat exchanging relation therewith in a vacuum chamber so that the volatilized fluid is condensed.

The foregoing specification signed at Turin, Italy, this 16th day of October, 1919.

EUDO MONTI.

In presence of two witnesses—
 JOSEPH L. THORN,
 HENRIETTA DELFORNI.